United States Patent [19]

Cox

[11] Patent Number: 4,820,320

[45] Date of Patent: Apr. 11, 1989

[54] COMPACT DUST COLLECTOR

[76] Inventor: Donald G. Cox, 14 Briar Patch Rd., Bargersville, Ind. 46106

[21] Appl. No.: 156,037

[22] Filed: Feb. 16, 1988

[51] Int. Cl.$^4$ .............................................. B01D 46/04
[52] U.S. Cl. .................................... 55/302; 55/341.1; 55/379; 55/484; 55/508
[58] Field of Search ...................... 55/287, 302, 341.1, 55/379, 484, 508, 521

[56] References Cited

U.S. PATENT DOCUMENTS

| | | | |
|---|---|---|---|
| 3,577,705 | 5/1971 | Sharlit | 55/302 X |
| 3,944,404 | 3/1976 | Andrasfalvy | 55/302 X |
| 3,988,130 | 10/1976 | Ramsey et al. | 55/302 X |
| 4,097,255 | 6/1978 | Samolis | 55/302 X |
| 4,266,953 | 5/1981 | Matthys et al. | 55/302 X |
| 4,295,868 | 10/1981 | Holter et al. | 55/302 |
| 4,395,269 | 7/1983 | Schuler | 55/302 |
| 4,509,960 | 4/1985 | Engel | 55/287 |

Primary Examiner—Charles Hart
Attorney, Agent, or Firm—Woodard, Emhardt, Naughton Moriarty & McNett

[57] ABSTRACT

A dust collector including a housing having an entrance opening and an exit opening at generally the same elevation. The housing has an uppermost portion, and a lowermost hopper portion with at least one generally downwardly and inwardly sloping flat surface. At the bottom of the hopper is a transfer gate assembly. A flat interior wall is mounted within the housing parallel to, but spaced from a flat sloping wall of the hopper. Cylindrically shaped filter elements are mounted within the housing between and substantially flush to the interior wall and the parallel hopper wall. Thus all filter elements are mounted at least partially within the hopper. The filter elements are mounted wherein filter elements in any particular row are not vertically aligned with any filter elements in an immediately adjacent row. A pulse jet cleaning means is operably associated with the filter elements. Deflector shields are mounted within the housing in a location between the uppermost filter elements and the entrance opening.

18 Claims, 5 Drawing Sheets

COMPACT DUST COLLECTOR

BACKGROUND OF THE INVENTION

1. Field of the Invention

The present invention is in the field of compact dust collectors.

2. Description of the Prior Art

Industrial processes and combustion of solid fuel often result in the suspension of potentially hazardous particulate matter in the air. Consequently, in many industries, systems for filtering air or other gases are required.

As described in U.S. Pat. No. 4,395,269 to Schuler, early systems for meeting these filtering needs were often bulky, difficult to install, and subject to damage and rapid wear. Schuler discloses an effort to meet the industry need for a more compact and more efficient air filtration system. The air filtering system in Schuler has a housing which includes an uppermost portion, and a lowermost portion which is commonly known as the hopper of a dust collector. Cylindrical filter elements are mounted in an inclined direction within the housing upon an interior wall of stepped construction. Accordingly, to provide convenient access to the filter elements from points exterior of the housing, the exterior wall against which the opposite ends of the filter elements fall must also be of stepped construction. A stepped wall is more difficult and more expensive to construct than a flat wall contained in a single plane.

The filter elements in Schuler are mounted almost entirely within the uppermost portion of the housing resulting in a large volume of non-utilized space within the same. Thus, the housing may be more capacious than it need be. Additionally, Schuler discloses filter elements arranged in rows, wherein filter elements in lower rows are vertically aligned with filter elements in upper rows. Consequently, contamination of lower filter elements is increased by particulate matter falling from vertically aligned upper filter elements, as when the pulse jet cleaning means are operated. Schuler discloses a system designed to reduce this effect which contemplates pulse jet cleaning uppermost filter elements first, with the cleaning of the remaining filter elements occurring from top to bottom in the assembly. However, this system does not completely eliminate increased contamination of lower filter elements because they are nevertheless subjected to greatly increased impingement by particulate matter. Additionally, such a pulse jet cleaning system is more complex and more expensive than a system which pulse jet cleans all filter elements simultaneously.

U.S. Pat. No. 4,509,960 to Engel discloses an invention directed to a dust collector. The dust collector of Engel is generally more complex than the air filtering assembly of Schuler. Nevertheless, it also includes a housing having an uppermost portion and a lowermost hopper portion. The filter elements of Engel are of a rectangular construction, and like the filter elements of Schuler, are mounted substantially within the uppermost portion of the housing, with lower filter elements being vertically aligned with filter elements within a row immediately above. Another similarity between the disclosures of Schuler and Engel is that their entrance and exit openings occur at differing elevations. Thus, to modularize a number of dust collectors to direct air through successive dust collectors, thereby more completely filtering air, one would need elevatory adjustment means, such as a contoured pipe, between the exit opening of one dust collector and the entrance opening of another. Such adjustment means are both bulky and expensive.

The inventor also has knowledge of dust collectors manufactured by Torit division of the Donaldson Company. Specifically, these are models 2DF8, 2DF12, 2DF16, 3DF24, 3DF36, 3DF60, 3DF72, 4DF32, 4DF48, 4DF64, 4DF80. These dust collectors are strikingly similar to the air filtering system disclosed in Schuler. Generally, these models include housings having uppermost portions and lowermost hopper portions. Cylindrically shaped filter elements are mounted therein upon walls of stepped construction. Further, the filter elements are mounted in an inclined direction and substantially within the uppermost portions of the dust collectors. Additionally, the filter elements are arranged wherein lower filter elements are vertically aligned with filter elements in rows immediately thereabove, and their entrance openings and exit openings occur at different elevations. Some of the above models include a number of individual dust collector units in tandem to enable the filtration of larger volumes of air, which is not to be confused with modularizing a number of dust collectors to direct air sequentially through them thereby more completely filtering the same.

In light of the inventions disclosed in Schuler, Engel, and the above Torit models, there exists a continued need for a dust collector of an even more compact construction, and of a design incorporating filter elements mounted in a space efficient inclined position, yet eliminating the need of having walls of stepped construction. An improved design would also minimize filter element contamination resulting from the pulse jet cleaning operation, and enable modularization of a number of dust collectors without elevatory adjustment means.

SUMMARY OF THE INVENTION

The present invention relates to a more compact and efficient dust collector.

One embodiment of the present invention provides a dust collector having a housing including an upper wall, side walls, and a closed bottom. Filtering means mounted within the dust collector are operable to filter air moving in a first direction therethrough. Pulsing means operably associated with the filtering means are operable to direct pulses of pressurized air in a direction opposite from the first direction and of a magnitude greater than the same. A transfer gate assembly at the bottom of the dust collector provides means for the removal of particulate matter therefrom. Additionally, the housing of the dust collector has an entrance opening and an exit opening which are at generally the same elevation. In this manner, two adjacent dust collectors may be modularized without the need of elevatory adjustment means.

Another embodiment of the present invention provides a dust collector having a housing including an upper wall, side walls, a closed bottom, and an entrance opening and an exit opening. Filtering means mounted within the dust collector are operable to filter air moving in a first direction therethrough. The filtering means include filter elements mounted in at least two substantially parallel rows such that filter elements in a lower row are vertically staggered with respect to all (not vertically aligned with any) filter elements in an immediately adjacent row located thereabove. In this manner, particulate matter which is dislodged and falls from upper filter elements does not substantially impinge upon filter elements in rows immediately below, and thus overall contamination of lower filter elements is reduced. Pulsing means operably associated with the filtering means are operable to direct pulses of pressurized air in a direction opposite the air moving in the first direction and of a magnitude greater than the same. A lowermost portion of the housing, generally known as a hopper, is designed for the collection of particulate matter. A transfer gate assembly located at the bottom of the hopper provides means to remove collected particulate matter from the dust collector.

Another embodiment of the present invention provides a dust collector having a housing including an upper wall, side walls depending therefrom, a lowermost portion arranged and constructed for the collection of particulate matter, a closed bottom, and an entrance opening and an exit opening. The lowermost portion has at least one generally downward sloping flat wall. Filtering means mounted within the housing are operable to filter air moving in a first direction therethrough. The filtering means include filter elements mounted in an inclined direction substantially flush against the downward sloping flat wall of the hopper portion. In such an arrangement, all filter elements are mounted at least partially within the lowermost portion (hopper) of the dust collector enabling a more compact combination of the same. Additionally, ends of the filter elements are all coplanar and thus the need of having walls of stepped construction is avoided. Pulsing means operably associated with the filtering means are operable to direct pulses of pressurized air in a direction opposite the air moving in the first direction and of a magnitude greater than the same. A transfer gate assembly located in the lowermost portion of the housing provides means to remove collected particulate matter from the dust collector.

Another embodiment of the present invention provides a dust collector having all of the features of the three embodiments described above.

Preferably, in the above embodiments, deflector shields mounted in a location between the uppermost filter elements and the entrance opening protect uppermost filter elements from direct impingement by large objects which may fall or be drawn into the dust collector. The deflector shields additionally provide a more desirable and even distribution of the air among the filter elements and within the dust collector.

One object of the present invention is to provide a compact dust collector.

Another object of the present invention is to provide a dust collector which may be directly mated with an adjacent dust collector of substantially identical construction without elevatory adjustment means.

Another object of the of the present invention is to provide a dust collector having filter elements mounted therein in an arrangement wherein filter contamination resulting from particulate matter falling from upper filter elements to the bottom of the dust collector is reduced.

Yet another object of the present invention is to provide a dust collector having filter elements inclinedly mounted therein in an arrangement wherein walls of the dust collector need not be of stepped construction.

Related objects and advantages will be apparent from the following description. BRIEF DESCRIPTION OF THE DRAWINGS

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
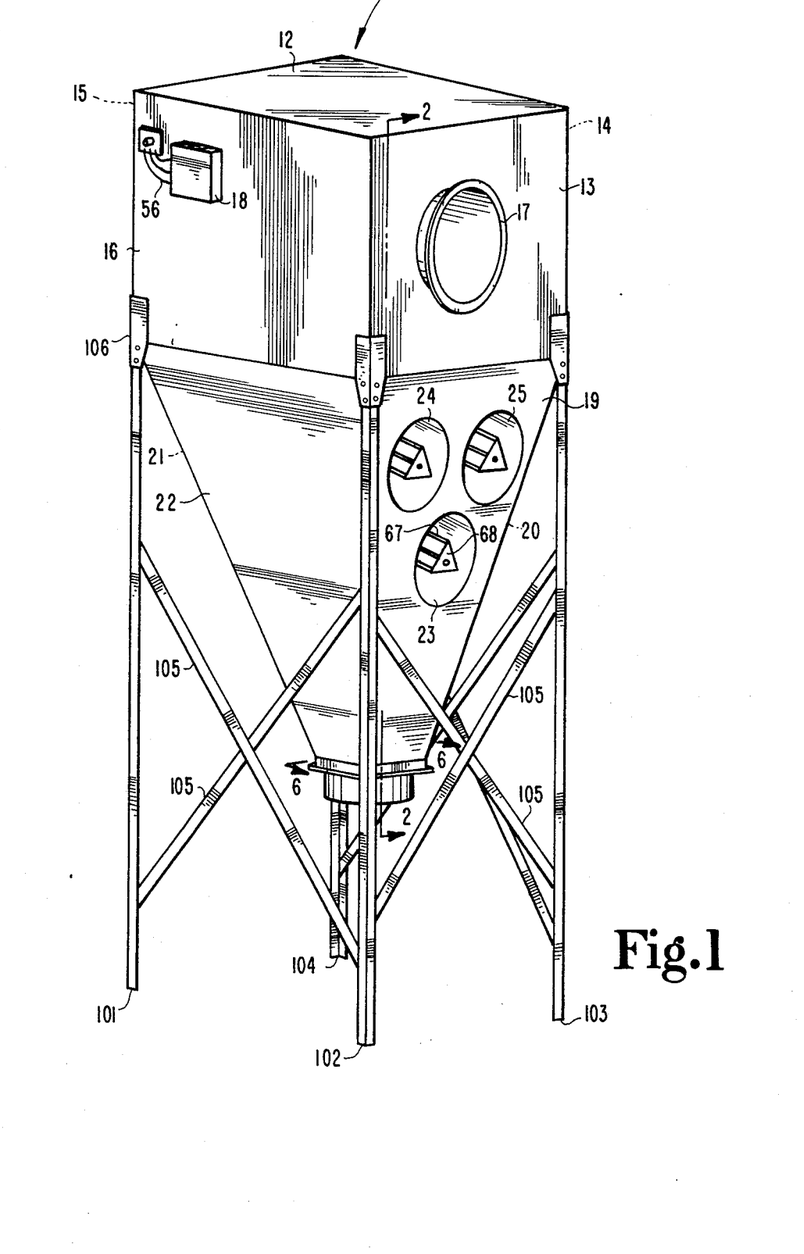
FIG. 1 is a perspective view of a dust collector incorporating the present invention.

Referring now more particularly to FIG. 1, there is shown a dust collector 11, having a rectangularly shaped upper wall 12 with rectangularly shaped side walls 13, 14, 15 and 16 fixedly attached thereto and depending therefrom. Fixedly attached to and depending from side walls 13, 14, 15 and 16 are tapered hopper walls 19, 20, 21 and 22, which generally slope downward and inward and together form what is known in the art as the hopper of a dust collector. These walls may be constructed of steel or another suitable material. The upper wall-side wall and side wall-hopper wall attachments may be accomplished by welding or some other suitable conventional method. Side wall 13 has a circular entrance opening 17 into which air to be filtered enters the dust collector 11. Fixedly attached to side wall 16 is a source of pressurized air 18, which is a part of a pulsing apparatus which will be more particularly described as the description proceeds. Hopper wall 19 has three circular filter door openings 23, 24 and 25, which provides access to filter elements mounted within the dust collector.

Figure 2:
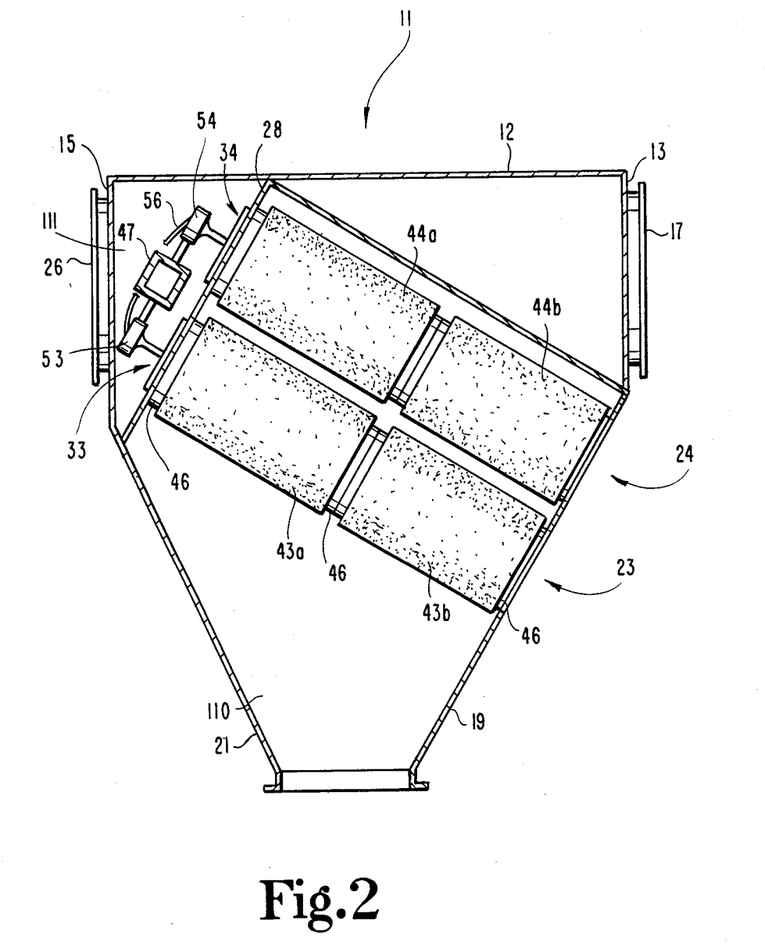
FIG. 2 is a cross-sectional view taken along arrow 2—2 of FIG. 1 and viewed in the direction of the arrows.

Referring now to FIG. 2, side wall 15 has an exit opening 26 from which filtered air exits the dust collector 11. Exit opening 26 is at generally the same elevation as entrance opening 17 and is directly opposite the same. In this manner, two substantially identical dust collectors may be mated without elevatory adjustment means, such as contoured pipes connecting the exit opening of one dust collector to the entrance opening of the other. Entrance opening 17 and exit opening 26 may be adapted to mate with, respectively, the exit opening and entrance opening of a pair of dust collectors constructed substantially identical to dust collector 11. An interior wall 27 extends between and is fixedly attached to hopper wall 21 and upper wall 12, by welding or some other suitable means. Additionally, interior wall 28 extends between and fixedly attached to side walls 14 and 16 (FIG. 1) by welding or another suitable means. Interior wall 28 is mounted substantially parallel to the opposite hopper wall 19, and has three circular interior wall openings 33, 34 and 35 (35 occurs directly behind 34 and is therefore not shown) which correspond to and are aligned with filter door openings 23, 24 and 25, respectively, in hopper wall 19.

Filter elements 43a, 43b, 44a, 44b, 45a and 45b (45a and 45b occur directly behind 44a and 44b and are therefore not shown) are mounted between interior wall 28 and hopper wall 19. Filter elements 43a and 43b are positioned end to end and are axially aligned with and mounted between filter door opening 23 and interior wall opening 33. Filter elements 44a and 44b, and 45a and 45b, are similarly positioned and are axially aligned with and mounted between filter door openings 24 and 25 and their corresponding interior wall openings 34 and 35, respectively. The method of mounting filter elements will be described more particularly as the description proceeds. Filter elements 43a and 43b, 44a and 44b, and 45a and 45b, are constructed of pleated filter media and are cylindrical in shape, having hollow centers and being equipped with rubber or plastic gaskets 46 on each end. Such filter elements are known in the art and are also described in U.S. Pat. No. 4,395,269 to Schuler, which is herewith incorporated by reference.

A large beam 47 made of steel or some other suitable material, extends between and is fixedly attached to side walls 14 and 16 (FIG. 1) by welding or some other suitable method. Beam 47 mounts pressurized air nozzles 53, 54 and 55 (55 occurs directly behind 54 and is therefore not shown), in positions wherein pulses of pressurized air flowing from nozzles 53, 54 and 55 travel through interior wall openings 33, 34 and 35, respectively, and into the hollow centers of filter elements 43a and 43b, 44a and 44b, and 45a and 45b, respectively, dislodging particulate matter therefrom. The pulsing apparatus further consists of three segments of tubing 56 suitable to withstand communication of pressurized air pulses, such as plastic or rubber tubing. Each segment of tubing 56 is equipped on each end with conventional fittings for attaching to air nozzles and sources of pressurized air. One end of each segment of tubing 56 is attached to one of the pressurized air nozzles 53, 54 or 55. The other end of the tubing 56 extends through a small opening in side wall 16 and is attached to a source of pressurized air (18 FIG. 1). Source of pressurized air 18 may be mechanically operated in order to direct a pulse of air, or, preferably, is attached to a timing device which operates it automatically at timed intervals. Such timing devices, tubing, and nozzles are known in the art.

Figure 3:
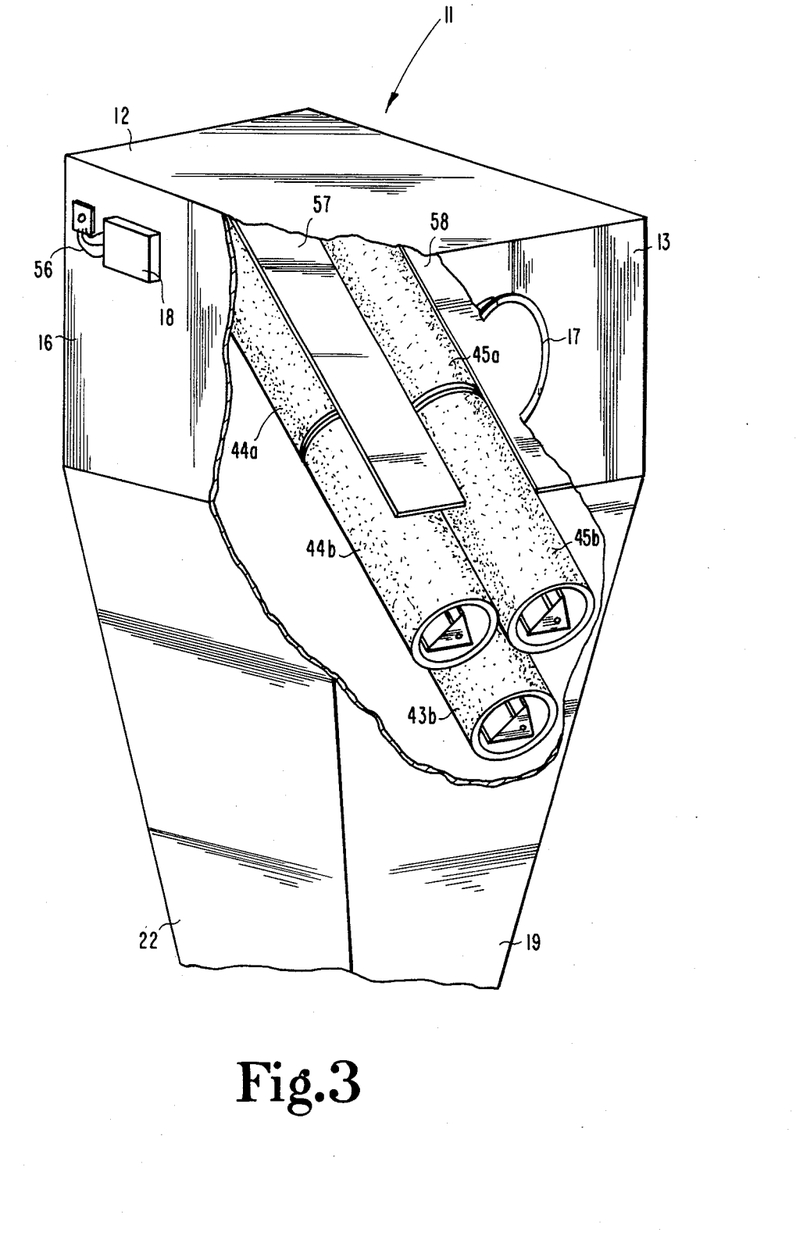
FIG. 3 is a view of the dust collector viewed from the same angle as FIG. 1, with portions of the dust collector broken away to illustrate the filter elements.

Referring now to FIG. 3, there is shown deflector shields 57 and 58 which extend between and are fixedly attached to upper wall 12 and hopper wall 19 by welding or some other suitable method. Deflector shields 57 and 58 are constructed of steel or some other suitable material, and are mounted above and substantially parallel to uppermost filter elements 44a and 44b, and 45a and 45b, and in a plane perpendicular to side walls 14 and 16. Deflector shields 57 and 58 are therefore located between entrance opening 17 and the uppermost filter elements 44a and 44b, and 45a and 45b, and protect the same from direct impingement by large objects which might fall or be drawn into the dust collector. Deflector shields 57 and 58 further serve as a baffle means to effect a more even and desirable circulation of air within the dust collector 11, and among the filter elements 43a and 43b, 44a and 44b, and 45a and 45b.

Also shown in FIG. 3 is the arrangement of filter elements within dust collector 11. A lower row, containing filter elements 43a and 43b (43a not shown), is positioned below and generally centered between an upper row containing filter elements 44a and 44b, and 45a and 45b. In this manner, the lower filter elements 43a and 43b are vertically staggered with respect to all (not vertically aligned with any) upper filter elements 44a and 44b, and 45a and 45b, and therefore particulate matter which falls from the uppermost filter elements 44a and 44b, and 45a and 45b, as when the pulsing means are operated, falls to the bottom of the dust collector without substantially impinging upon lower filter elements 43a and 43b. This reduces overall filter element contamination and thus prolongs filter element life. Additional rows of filter element pairs could be mounted within the dust collector 11. The filter element pairs could be equally spaced apart at a distance substantially the same as that between filter element pair 44a and 44b and pair 45a and 45b. The additional rows could increase in the number of filter element pairs included therein by one, and be positioned above and generally centered over previous rows. For example, a third row containing three pairs of filter elements could be located above and generally centered over the row containing filter elements 44a and 44b, and 45a and 45b. This would preserve the arrangement wherein filter elements within any particular row are vertically staggered with respect to all filter elements within immediately adjacent rows.

Figure 4:
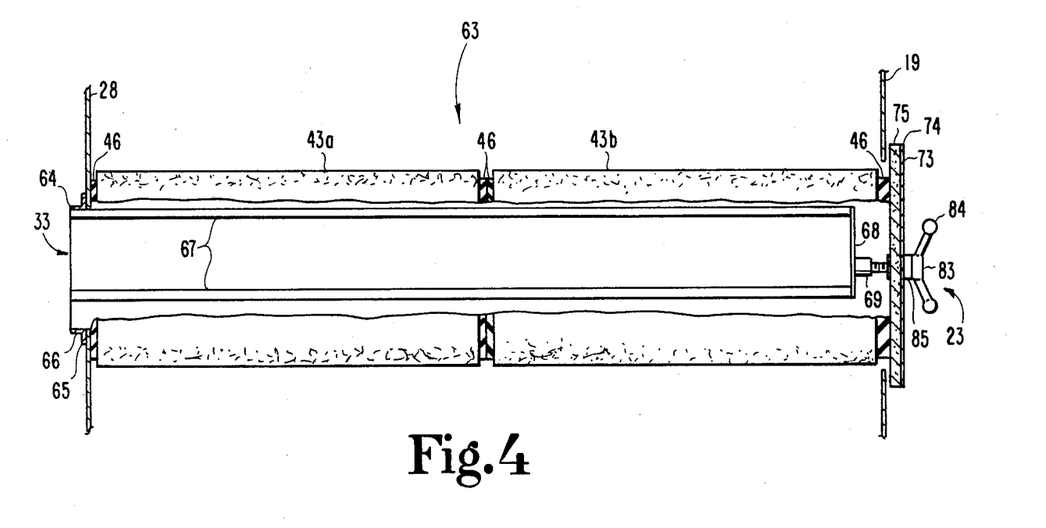
FIG. 4 is a fragmentary enlarged side view of one of the filter elements of FIG. 3 and showing the mounting and filter door assemblies.
Figure 5:
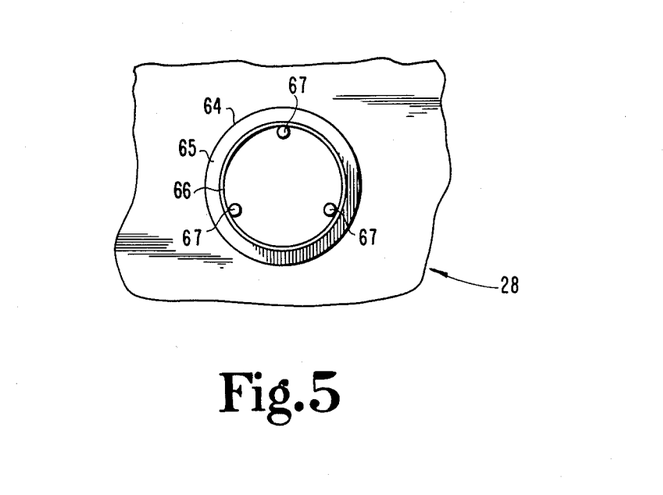
FIG. 5 is a left end view of the filter element of FIG. 4.

Referring now to FIG. 4, there is shown a filter mounting and door assembly 63, which mounts and houses filter elements 43a and 43b. It is understood that identical filter mounting and door assemblies are provided to mount filter elements 44a and 44b, and 45a and 45b. To repeat, interior wall 28 has interior wall opening 33, which corresponds and is aligned with filter door opening 23. A metal collar 64 is fixedly attached to the exterior surface of interior wall 28, by bolting or other suitable method, in a location wherein it surrounds interior wall opening 33. Metal collar 64 includes a metal ring portion 65 with a collar portion 66 fixedly attached to its inner edge. Three substantially parallel rods 67, made of steel or another suitable material, are fixedly attached by welding or some other suitable means to the inner surface of metal collar 64 at points about the collar generally forming the vertices of an equilateral triangle. This is more clearly illustrated in FIG. 5. Referring now back to FIG. 4, the rods 67 extend generally between interior wall 28 and hopper wall 19 falling just short of protruding from filter door opening 23. Rods 67 are of a length which accommodates filter elements 43a and 43b when placed end to end, which may be slipped over the generally triangularly placed rods 67 and supported thereby. A triangularly shaped plate 68, constructed of steel or other suitable material, is fixedly attached, by welding or some other suitable method, to the ends of rods 67 which are closest to hopper wall 19. This configuration is more clearly illustrated in FIG. 1. Referring now back to FIG. 4, a threaded nut 69 is fixedly attached to the ouside of triangular plate 68 by welding or other suitable means. Threaded nut 69 could be, for example, a one-half inch coup nut. A circularly shaped filter door 73 constructed of an outer metal portion 74 and an inner foam portion 75 has a diameter slightly larger than the diameter of filter door opening 23. A threaded bolt 83 equipped with a handle 84 and having a spring pin 85 is extended through a small opening in the middle of filter door 73 and threaded into nut 69, thus tightening filter door 73 against hopper wall 19. The tightening of filter door 73 against hopper wall 19 effectively seals filter door opening 23, and simultaneously causes filter door 73 to contact and exert pressure upon the proximal gasket 46 of filter element 43b. In this manner, seals are formed between filter door 73 and the proximal gasket 46 of filter element 43b, between the contacting gaskets 46 of filter elements 43a and 43b, and between the distal gasket 46 of filter element 43a and the inner surface of interior wall 28. This places the hollow interiors of filter elements 43a and 43b in fluid connection with interior wall opening 33. Filter door 73 is removable by unscrewing bolt 83 from nut 69, thereby allowing access for servicing or removal of filter elements.

Figure 6:
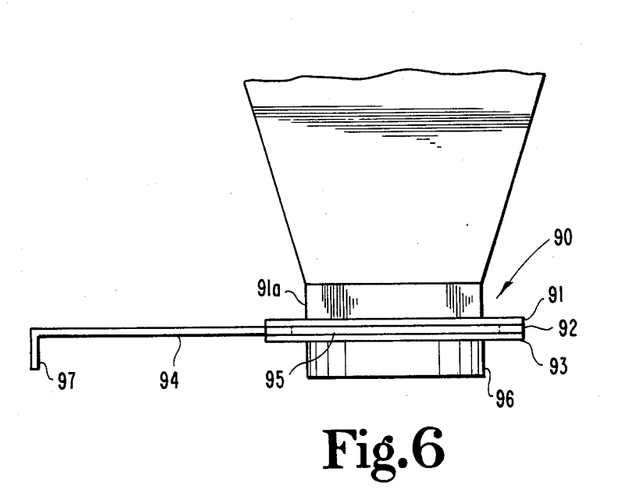
FIG. 6 is a cross-sectional view of the transfer gate assembly at the bottom of the dust collector, taken along arrow 6—6 of FIG. 1 and viewed in the direction of the arrows.

Referring now to FIG. 6, there is shown a transfer gate assembly 90 which is found at the bottom of the dust collector. Transfer gate assembly 90 consists of four pieces including an upper gate piece 91 having an upwardly extending collar 91a, spacers 92, a lower gate piece 93, and a slide gate 94, all of which may be constructed of steel or another suitable material. The assembly of upper gate piece 91, spacers 92, and lower gate piece 93 forms a slot 95 into which slide gate 94 may be extended.

Figure 7:
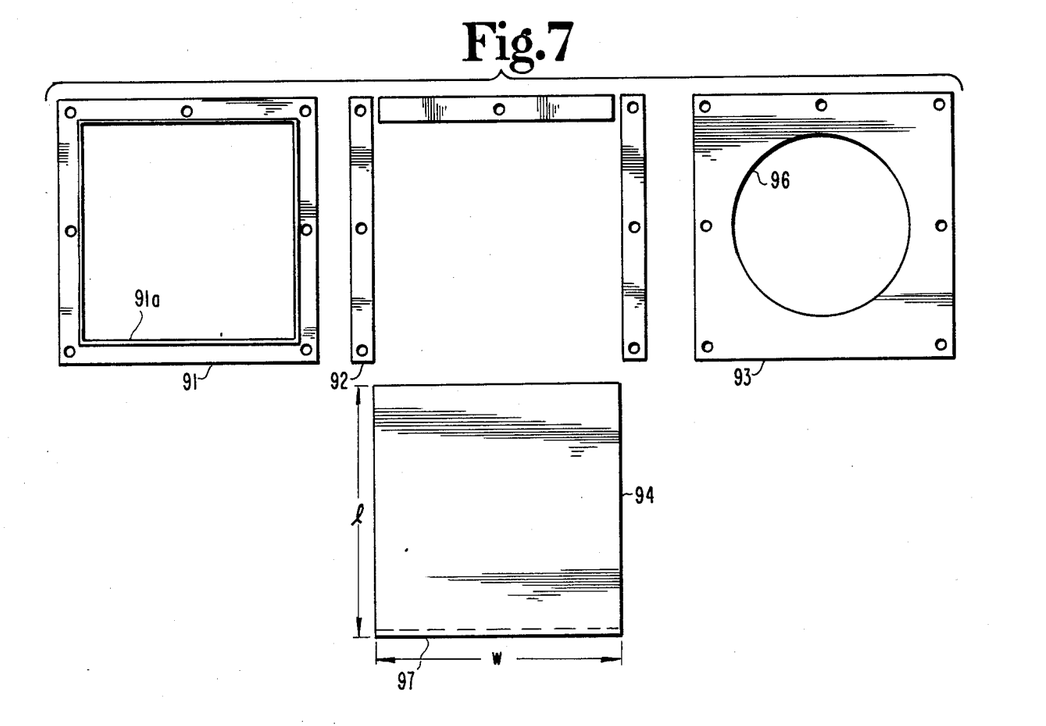
FIG. 7 is a view of the component parts of the transfer gate assembly of FIG. 6, separated and viewed from above.

Referring now to FIG. 7, the construction of transfer gate assembly 90 and its components will be further described. Upper gate piece 91 has a thickness on the order of ⅜ths of an inch and is generally square in shape with a squarely hollowed out center, and has an upwardly extending collar 91a attached to its inner periphery. Upper gate piece 91 has a number of bolt holes which occur along three of its sides, and is fixedly attached at its upwardly extending collar 91a to the lowermost ends of hopper walls 19, 20, 21 and 22 (FIG. 1) by welding or some other suitable method. Spacers 92 are provided, and have a thickness on the order of ⅛ hs of an inch and bolt holes which correspond to the bolt holes in upper gate piece 91. Spacers 92 are positioned immediately below and contacting upper gate piece 91. Lower gate piece 93, having a thickness of about ⅜ths of an inch, is generally square in shape and has a circularly hollowed out center and a dependant collar 96. Lower gate piece 93 has bolt holes which correspond with the bolt holes of spacers 92 and upper gate piece 91. Lower gate piece 93 is positioned immediately below and contacting spacers 92 and a bolt is extended through the corresponding bolt holes of lower gate piece 93, spacers 92, and upper gate piece 91. The bolts are fastened with nuts and the resulting assembly forms a slot (95 FIG. 6), into which slide gate 94 may be extended. Slide gate 94 is of a width (w) that corresponds with the formed slot 95, and of a length (l) which allows it to protrude slightly from slot 95 when it is extended completely into the same. Slide gate 94 may have a bent portion 97 (more clearly illustrated in FIG. 6) on its protruding end forming a handle and thus facilitating its insertion and removal from slot 95.

Referring now back to FIG. 1, dust collector 11 is preferably mounted upon a framework of legs 101, 102, 103 and 104 which may be constructed of segments of angle iron or another suitable conventional material. Support beams 105 may also be constructed of angle iron and extend between legs 101, 102, 103, 104. A mounting bracket 106 is constructed of steel or another suitable material, and is bent at an angle of substantially 90 degrees so that is is complementary to the corner formed by the junction of side walls 15 and 16. Mounting bracket 106 is fixedly attached, by welding or another suitable method, to dust collector 11 at and about the junction of side walls 15 and 16. Leg 101 is fixedly attached to bracket 106 by bolting or other suitable means. It is understood that identical mounting brackets are provided and attach legs 102, 103 and 104 at their respective corners of dust collector 11.

Operation of the Invention

Referring now to FIGS. 1-7, the operation of the invention will now be described. Air laden with particular matter flowing into entrance opening 17 enters an air filtering chamber (110 FIG. 2) defined by the interior surfaces of upper wall 12, interior wall 28, side walls 13, 14 and 16, hopper walls 19, 20 and 21, and slide gate 94. Deflector shields 57 and 58 prevent the air from directly impinging upon uppermost filter elements 44a, 44b, 45a and 45b, and the air travels in a generally downward direction into filtering chamber 110. A clean air chamber (111 FIG. 2) is defined by the exterior surface of interior wall 28, and the interior surfaces of upper wall 12 and side walls 14, 15 and 16. Fluid connection between filtering chamber 110 and clean air chamber 111 is established only through the hollow interiors of filter elements 43a, 43b, 44a, 44b, 45a and 45b, which correspond with interior wall openings 33, 34 and 35. The seals formed by gaskets 46 prevent air within filtering chamber 110 from reaching the hollow centers of filter elements except by traveling through the pleated media portions of the same. Air reaching the hollow centers of filter elements is therefore effectively filtered, and may travel upward through filter elements, through interior wall openings 33, 34 and 35, into clean air chamber 111, and out of exit opening 26.

As particulate matter collects on filter elements 43a, 43b, 44a, 44b, 45a and 45b, source of pressurized air 18 is activated and directs a pulse of pressurized air through tubing segments 56 and out of nozzles 53, 54 and 55. The pulses of air emerging from nozzles 53, 54 and 55 travel in a direction opposite that of the air entering the clean air chamber 111 through the interior wall openings 33, 34 and 35, and of a magnitude greater than the same. In this manner, the pulses travel into the hollow interiors of filter elements and dislodge particulate matter from the same. Particulate matter thus dislodged is carried downward by gravitational and fluid forces and collects in the bottom of the filtering chamber 110. As particulate matter collects in the bottom of filtering chamber 110, slide gate 94 is removed from slot 95 and the collected particulate matter is thus transferred to a location exterior to the dust collector 11.

As filter elements 43a and 43b become worn, bolt 83 is unthreaded from nut 69 thus removing filter door 73 and exposing filter door opening 23. Thereafter, filter elements 43a and 43b may be slid off of rods 67 and removed from dust collector 11, and replacement filter elements may be installed. It is understood that a similar operation may be performed to replace filter elements 44a and 44b, and 45a and 45b.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A dust collector comprising:

a housing having an upper wall, side walls depending from said upper wall, and an entrance opening and an exit opening;

filtering means mounted within said housing and operable to filter air moving in a first direction therethrough, said filtering means comprising at least two substantially parallel rows of filter elements including a lowermost row, wherein filter elements within said lowermost row are vertically staggered with respect to all upper filter elements within an adjacent row located immediately thereabove;

pulsing means operably associated with said filtering means and operable to direct pulses of pressurized air flow in a direction opposite from said first direction and of a magnitude greater than said air moving in said first direction through said filter means dislodging foreign particulate matter from said filter means, said housing having a lowermost portion positioned to receive said foreign particulate matter from said filter means as said pulsing means dislodges same; and, transfer means in said lowermost portion of said housing for transferring said particulate matter from within said lowermost portion to a location exterior to said housing.

2. The dust collector of claim 1, wherein:
said filtering means includes:
a lowermost row having a single filter element; and
a second row generally centered over said single filter element in said lowermost row, wherein said second row contains two filter elements.

3. The dust collector of claim 2 wherein:
said entrance opening is directly opposite said exit opening.

4. The dust collector of claim 3 wherein:
said filtering means includes:
a number of rows of filters with said rows including a top row and a lower row therebeneath, said top row is centered over said lower row, said top row has one more filter than said lower row.

5. The dust collector of claim 1 further comprising:
mounting means for mounting said filter elements wherein said mounting means includes groups of three cantileveredly supported rod elements with said rod elements substantially parallel to each other in a generally triangular formations.

6. The dust collector of claim 1 further comprising:
deflector means for deflecting air moving in said first direction positioned between said entrance opening and said upper filter elements.

7. A dust collector comprising:
a housing having an upper wall, side walls depending from said upper wall, an entrance opening and an exit opening, and a lowermost portion arranged and constructed for the collection of particulate matter, said lowermost portion having at least one generally downward sloping surface;

filter elements mounted within said housing and operable to filter air moving in a first direction therethrough, wherein said filter elements are mounted in a generally inclined position with respect to said upper wall, wherein all filter elements mounted within said housing are mounted at least partially within said lowermost portion of said housing;

pulsing means operably associated with said filter elements and operable to direct pulses of pressurized air flow in a direction opposite from said first direction and of a magnitude greater than said air moving in said first direction through said filter elements dislodging foreign particulate matter from said filter elements; and, transfer means in said lowermost portion of said housing for transferring said particulate matter from within said lowermost portion to a location exterior to said housing.

8. The dust collector of claim 7 wherein:
said filter elements are substantially perpendicular to said downward sloping surface of said lowermost portion, wherein ends of said filter elements lie substantially flush against same.

9. The dust collector of claim 8 wherein:
said downward sloping surface has additional openings aligned with and corresponding to said ends of said filter elements.

10. The dust collector of claim 9 further comprising:
an interior wall of planar construction mounted to said housing and parallel to but spaced from said downwardly sloping surface with said filter elements being in contact with and located therebetween.

11. The dust collector of claim 10 wherein:
said interior wall has openings aligned with and corresponds to said additional openings in said downward sloping surface.

12. The dust collector of claim 7 further comprising:
mounting means for mounting said filter elements wherein said mounting means includes groups of three cantileveredly supported rod elements with said rod elements substantially parallel to each other in a generally triangular formations.

13. The dust collector of claim 7 further comprising:
deflector means for deflecting air moving in said first direction positioned between said entrance opening and said filter elements.

14. A dust collector comprising:
a housing having an upper wall, side walls depending from said upper wall, a lowermost portion having at least one generally downward sloping surface, one of said side walls having an entrance opening, and one of said side walls having an exit opening in a location wherein said entrance opening and said exit opening are of generally the same elevation;

filtering means mounted within said housing and operable to filter air moving in a first direction therethrough, said filtering means including at least two substantially parallel rows of filter elements including a lowermost row, wherein filter elements within said lowermost row are vertically staggered with respect to all filter elements within an adjacent row located immediately thereabove, wherein said filter elements are mounted in a generally inclined direction with respect to said upper wall, wherein all of said filter elements are mounted partially within said lowermost portion of said housing;

pulsing means operably associated with said filtering means and operable to direct pulses of pressurized air flow in a direction opposite from said first direction and of a magnitude greater than said air moving in said first direction through said filter means dislodging foreign particulate matter from said filter means, said lowermost portion being positioned to receive said foreign particulate matter from said filter means as said pulsing means dislodges same; and, transfer means in said lowermost portion of said housing for transferring said particulate matter from within said lowermost portion to a location exterior to said housing.

15. The dust collector of claim 14 wherein:
said filter elements are substantially perpendicular to said downward sloping surface of said lowermost portion, wherein ends of of said filter elements lie substantially flush against the same.

16. The dust collector of claim 14 further comprising:
an interior wall of planar construction mounted to said housing and parallel to but spaced from said downwardly sloping surface with said filter elements being in contact with and located therebetween.

17. The dust collector of claim 14 further comprising:
mounting means for mounting said filter elements wherein said mounting means includes groups of three cantileveredly supported rod elements with said rod elements substantially parallel to each other in a generally triangular formations.

18. The dust collector of claim 14 further comprising:
deflector means for deflecting air moving in said first direction positioned between said entrance opening and said filter elements.

* * * * *

UNITED STATES PATENT AND TRADEMARK OFFICE
CERTIFICATE OF CORRECTION

PATENT NO. : 4,820,320

DATED : April 11, 1989

INVENTOR(S) : Donald G. Cox

It is certified that error appears in the above-identified patent and that said Letters Patent is hereby corrected as shown below:

In column 4, line 57, please change "provides" to --provide--.
In column 5, line 3, please change "27" to --28--.
In column 7, line 45, please change "7/8hs" to --7/8ths--.
In column 8, line 4, please change "103,104" to --103 and 104--.

Signed and Sealed this

Twenty-fourth Day of October, 1989

*Attest:*

DONALD J. QUIGG

*Attesting Officer*  *Commissioner of Patents and Trademarks*